US012692007B2

(12) United States Patent
Weifenbach

(10) Patent No.: US 12,692,007 B2
(45) Date of Patent: Jul. 28, 2026

(54) EVACUATION SUPPORT SYSTEM, METHOD FOR SUPPORTING AN EVACUATION PROCEDURE, AND AIRCRAFT

(71) Applicant: Airbus Operations GmbH, Hamburg (DE)

(72) Inventor: Jörg Weifenbach, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 331 days.

(21) Appl. No.: 18/184,042

(22) Filed: Mar. 15, 2023

(65) Prior Publication Data

US 2023/0303255 A1 Sep. 28, 2023

(30) Foreign Application Priority Data

Mar. 28, 2022 (EP) .................................... 22164622

(51) Int. Cl.
*B64D 25/08* (2006.01)
*B64D 11/00* (2006.01)

(52) U.S. Cl.
CPC ...... *B64D 25/08* (2013.01); *B64D 2011/0038* (2013.01)

(58) Field of Classification Search
CPC ..................... B64D 25/08; B64D 2011/0038; B64D 25/00; G08B 7/066
See application file for complete search history.

(56) References Cited

U.S. PATENT DOCUMENTS

| | | | | |
|---|---|---|---|---|
| 4,347,499 A * | 8/1982 | Burkman, Sr. | ........ | B64D 25/00 340/332 |
| 6,249,221 B1 * | 6/2001 | Reed | ........................ | G08B 1/08 340/331 |
| 6,646,545 B2 * | 11/2003 | Bligh | ..................... | G08B 7/062 340/332 |
| 7,573,396 B2 * | 8/2009 | Stokes | ................... | B64D 25/00 307/64 |
| 7,579,945 B1 * | 8/2009 | Richter | ................. | G08B 25/14 340/506 |
| 7,619,538 B1 * | 11/2009 | Zarian | .................... | G08B 7/062 340/506 |
| 11,626,002 B2 * | 4/2023 | Donegan | .............. | G08B 27/005 340/540 |
| 2005/0052339 A1 * | 3/2005 | Sprague | .................. | G06F 3/147 345/1.1 |

(Continued)

FOREIGN PATENT DOCUMENTS

DE          3524457 A1          1/1987

OTHER PUBLICATIONS

European Search Report for European Patent Application No. 22164622 dated Sep. 9, 2022; priority document.

*Primary Examiner* — Donald J Wallace
*Assistant Examiner* — Jalal C Coduroglu
(74) *Attorney, Agent, or Firm* — Greer, Burns & Crain, Ltd.

(57) ABSTRACT

An evacuation support system comprising a signaling device configured to produce signals guiding evacuees (E) away from overcrowded exit points and towards less crowded exit points. The signaling device may include at least one visual signal and/or at least one audio signal. Also a method for supporting an evacuation procedure and an aircraft having the evacuation support system.

4 Claims, 3 Drawing Sheets

(56)          References Cited

U.S. PATENT DOCUMENTS

| | | | |
|---|---|---|---|
| 2006/0265664 A1* | 11/2006 | Simons ............... | G08B 27/001 |
| | | | 715/772 |
| 2007/0194922 A1* | 8/2007 | Nathan ................. | A62B 99/00 |
| | | | 340/8.1 |
| 2007/0279210 A1* | 12/2007 | Li ......................... | G08B 7/062 |
| | | | 702/22 |
| 2011/0251787 A1* | 10/2011 | Gupta .................. | H04L 67/125 |
| | | | 701/533 |
| 2014/0009274 A1* | 1/2014 | Kohlmeier-Beckmann ................ | |
| | | | B64D 25/14 |
| | | | 340/425.5 |
| 2015/0249787 A1* | 9/2015 | Hall ........................ | H04L 67/12 |
| | | | 348/372 |
| 2016/0003428 A1* | 1/2016 | Anderson ................ | F21S 4/26 |
| | | | 362/147 |
| 2017/0345265 A1* | 11/2017 | Zhao ....................... | G06V 20/53 |
| 2020/0094091 A1* | 3/2020 | Skaaksrud ............. | H04L 41/06 |
| 2022/0130293 A1* | 4/2022 | Cline ................... | G09F 27/004 |

* cited by examiner

EVACUATION SUPPORT SYSTEM, METHOD FOR SUPPORTING AN EVACUATION PROCEDURE, AND AIRCRAFT

CROSS-REFERENCES TO RELATED APPLICATIONS

This application claims the benefit of European Patent Application Number 22164622.7 filed on Mar. 28, 2022, the entire disclosure of which is incorporated herein by way of reference.

FIELD OF THE INVENTION

The present invention is directed to an evacuation support system, a method for supporting an evacuation procedure, and an aircraft.

BACKGROUND OF THE INVENTION

The present invention is discussed in the context of aircraft and the evacuation thereof, but can also be applied to other vehicles and other situations where quick evacuation of large amounts of people might be necessary.

Various malfunctions, accidents, and hazards can necessitate the evacuation of an aircraft. For the safety of the people to be evacuated, such an evacuation procedure is to be completed as fast as possible.

Evacuation procedures tend to be chaotic events, however. Every single evacuee only has limited information, and in general limited experience, with which to decide upon an individual course of action. In general, this can lead to each evacuee trying to evacuate through the nearest exit point. However, from a larger perspective, this behavior does not always lead to the most efficient movement pattern of the evacuees as a whole and can prolong the evacuation procedure.

In such cases, personnel is used to manage the evacuation procedure and increase the efficiency thereof. In a chaotic situation, however, personnel can have trouble conveying relevant information to the evacuees. Any sort of auxiliary technical means to support the personnel in managing the evacuation procedure would be desirable.

SUMMARY OF THE INVENTION

In view of the above, it is an object of the present invention to increase the efficiency of evacuation procedures.

According to the present invention, this problem is solved by an evacuation support system with the features of embodiments described herein, a method for supporting an evacuation procedure with the features of embodiments described herein, and an aircraft with the features of embodiments described herein.

A first aspect of the present invention provides an evacuation support system comprising a signaling device configured to produce signals guiding evacuees away from overcrowded exit points and towards less crowded exit points.

A further aspect of the present invention provides a method for supporting an evacuation procedure comprising a step of guiding evacuees away from overcrowded exit points and towards less crowded exit point via signals produce by a signaling device.

A further aspect of the present invention provides an aircraft comprising an evacuation support system according to the first aspect if the invention.

One embodiment of the present invention lies in using additional signals to motivate evacuees to move away from overcrowded exit points and to move towards less crowded exit points. Through a more even occupancy rate of all exit points, the evacuation procedure can be advantageously shortened.

Advantageous embodiments and further developments are apparent from the further dependent claims and from the description with reference to the figures.

According to an embodiment, the evacuation support system further comprises an input device configured to control the signaling device upon receiving a manual input. This gives personnel managing the evacuation procedure more control over the evacuation support system, allowing for advantageously customized adaptation to changing situations during the evacuation procedure.

According to a further embodiment, the evacuation support system further comprises a surveillance device configured to control the signaling device upon detecting overcrowding at one or more exit points. This can advantageously reduce the workload of personnel managing the evacuation procedure, allowing for a smoother evacuation procedure overall.

According to a further embodiment of the evacuation support system the signaling device comprises at least one visual signal. Visual signals can provide a prompt to evacuees to move in a certain direction with advantageously high noticeability and clarity.

According to a further embodiment of the evacuation support system the at least one visual signal comprises a dynamic light source. This way, the noticeability of the visual prompt can be advantageously increased.

According to a further embodiment of the evacuation support system the signaling device comprises at least one audio signal. This can provide an advantage in situations where visibility is low, e.g. when smoke is present.

According to a further embodiment, the evacuation support system comprises a computation device configured to dynamically control the signaling device. This way, the evacuation support system can automatically react to changes in the evacuation situation, further improving the efficiency of the evacuation procedure.

The above embodiments and further developments can be combined with each other as desired, if useful. Further possible embodiments, further developments and implementations of the invention also comprise combinations of features of the invention described above or below with respect to the embodiments which are not explicitly mentioned. In particular, the person skilled in the art will also add individual aspects as improvements or additions to the respective basic form of the present invention.

BRIEF DESCRIPTION OF THE DRAWINGS

The present invention is explained in more detail below with reference to the embodiments shown in the schematic figures.

The accompanying figures are intended to provide a further understanding of embodiments of the invention. They illustrate embodiments and, in connection with the description, serve to explain principles and concepts of the invention. Other embodiments and many of the advantages mentioned will be apparent with reference to the drawings. The elements of the drawings are not necessarily shown to scale with respect to each other.

DETAILED DESCRIPTION OF THE PREFERRED EMBODIMENTS

In the figures of the drawings, identical elements, features and components that have the same function and the same effect are each given the same reference signs, unless otherwise specified.

Figure 1:
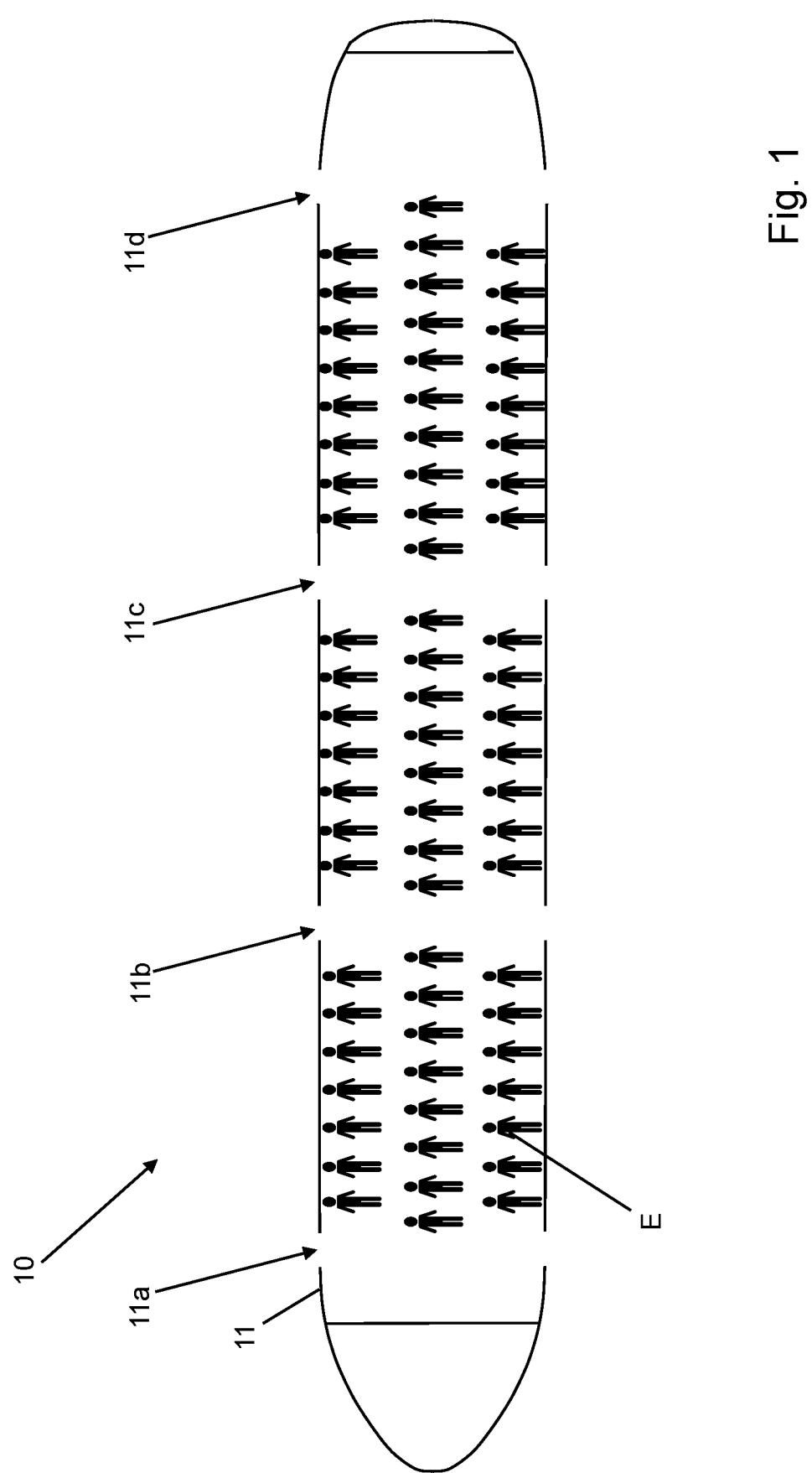
FIG. 1 shows a schematic illustration of an aircraft prior to an evacuation procedure.

FIG. 1 shows a schematic illustration of an aircraft 10 prior to an evacuation procedure.

The aircraft 10 comprises a cabin 11. A plurality of potential evacuees E, i.e. the passengers of the aircraft, are positioned within the cabin 11. Throughout the cabin, a plurality of exit points 11a, 11b, 11c, 11d are distributed along the wall of the cabin 11, both starboard as well as portside. Both the evacuees E and the exit points 11a, 11b, 11c, 11d, are spread out equally.

The aircraft 10 can comprise an evacuation support system, which is not shown in FIG. 1 for clarity reasons and will be further described with respect to the following figures.

Figure 2:
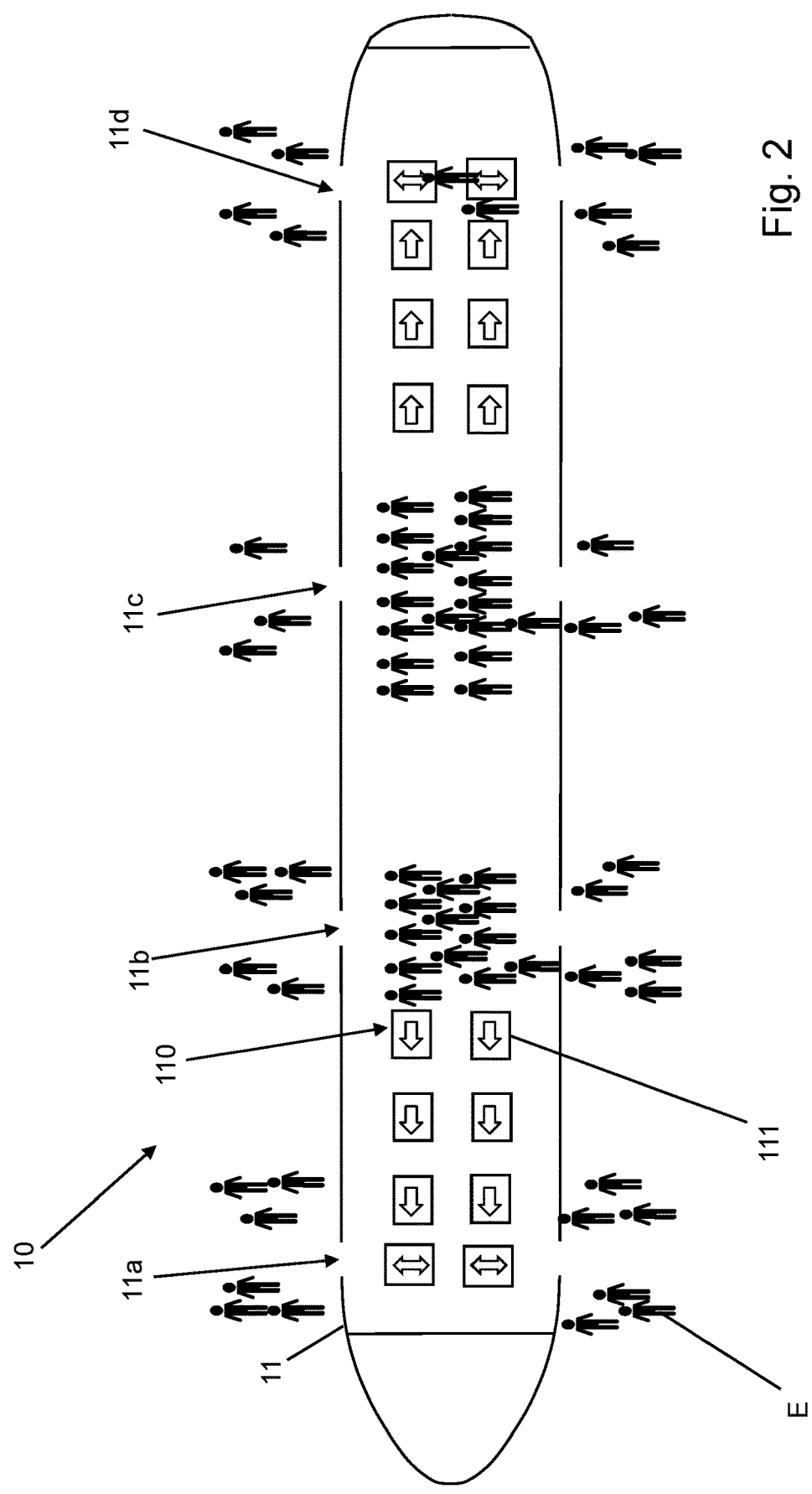
FIG. 2 shows a schematic illustration of an aircraft comprising an evacuation support system according to an embodiment of the present invention during an evacuation procedure.

FIG. 2 shows a schematic illustration of an aircraft 10 comprising an evacuation support system according to an embodiment of the present invention during an evacuation procedure.

The aircraft 10 comprises all features shown in FIG. 1. The aircraft 10 comprises an evacuation support system, of which only the signaling device 110 is shown for clarity reasons. The signaling device 110 comprises a plurality of visual signals 111 spread throughout the cabin 11 of the aircraft 10.

During an evacuation procedure, each evacuee E will try to exit the aircraft 10 through one of the exit points 11a, 11b, 11c, and 11d. As each evacuee E will first try to reach the exit point closest to their initial position, geometry alone indicates that more evacuees E will try to leave the aircraft 10 through one of the middle exit points 11b and 11c than through the front and back exit points 11a and 11d. If, as is often the case, all exit points are designed in the same or at least a similar manner, this can lead to the situation that evacuees E will still wait for their opportunity to leave through one of the middle exit points 11b and 11c, at a time when front and back exit points 11a and 11d are no longer, or only very lowly, occupied by evacuees E. This situation is shown FIG. 2.

In such a situation, the evacuation procedure can be sped up by guiding evacuees E away from the overcrowded exit points 11b and 11c, towards the less crowded exit points 11a and 11d. In the embodiment shown in FIG. 2, this can achieved via visual signals 111 of a signaling device 110. Such visual signals 111 can for example show arrows indicating the way towards less crowded exit points 11a and 11d. These signals can prompt evacuees E to move away from crowded exit points 11b and 11c, allowing for a swifter evacuation through exit points 11a and 11d.

FIG. 2 shows the visual signals 111 to be static arrows. In order to maximize the guidance effect, visual signals 111 can also comprise dynamic light sources like blinking arrows or even arrows moving along an elongated LED display.

Figure 3:
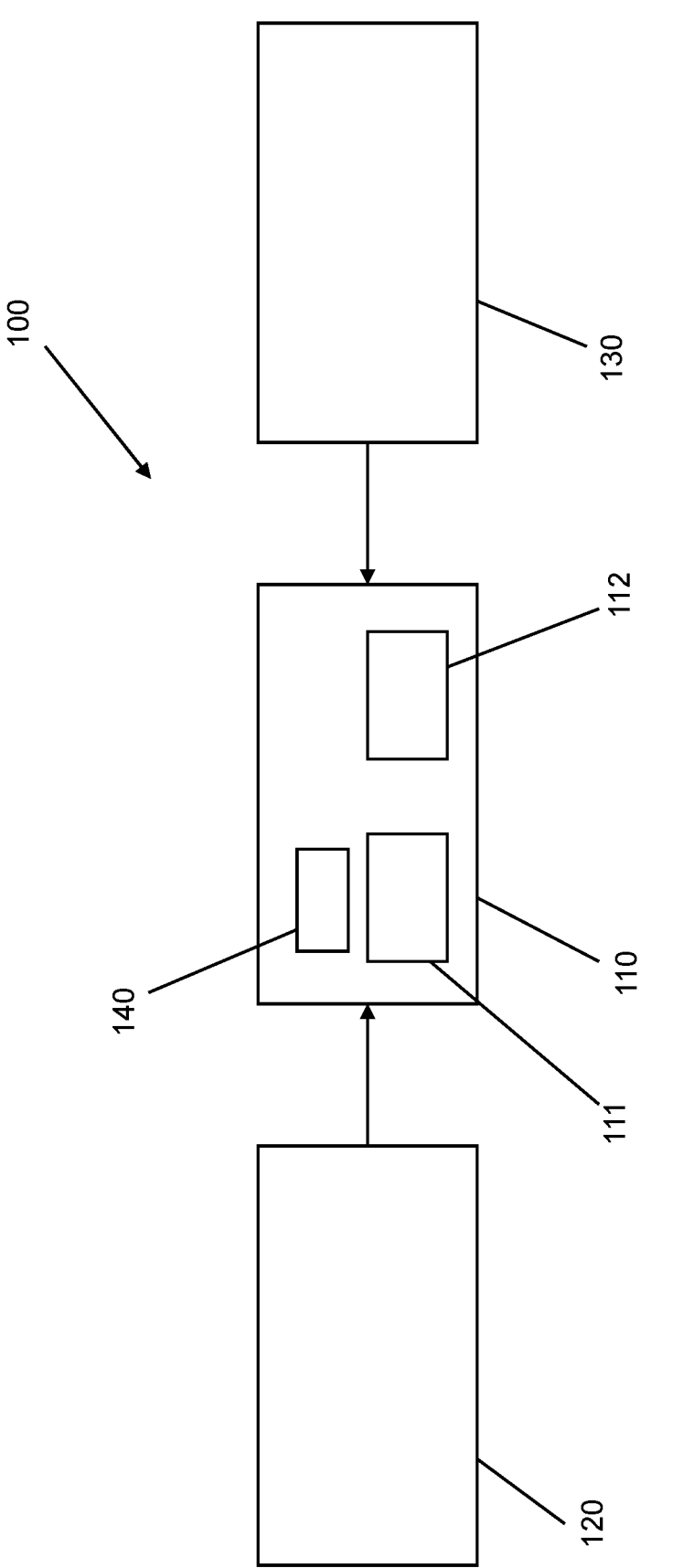
FIG. 3 shows a schematic illustration of an evacuation support system according to an embodiment of the present invention.

FIG. 3 shows a schematic illustration of an evacuation support system 100 according to an embodiment of the present invention.

The evacuation support system 100 comprises a signal device 110, an input device 120, and a surveillance device 130. The signal device 110 comprises a visual signal 111 and an audio signal 112, as well as a computation device 140.

During an evacuation procedure, if one or more exit points are being overcrowded, personnel managing the evacuation procedure, e.g. flight attendants, who detect said overcrowding can use the input device 120 to control, e.g. activate, the signal device 120, which can utilize the visual signal 111 and/or the audio signal 112 to guide evacuees towards less crowded exit points.

Such an input device 120 can for example be installed at the exit points, e.g. in form of a button, and personnel can push the button at a less occupied exit point in order to control the signal device 110 in guiding evacuees to said less occupied exit points. Alternatively, or additionally, the input device 120 can also be configured such that personnel can push a button at an overcrowded exit point in order to control the signal device 110 in guiding evacuees away from said overcrowded exit points. Alternatively, or additionally, the input device 120 can comprise a mobile, e.g. hand-held, device through which personnel can control the signal device 110 in an appropriate way.

In addition or as an alternative to the input device 120, the evacuation support system 100 shown in FIG. 3 comprises a surveillance device 130. The surveillance device 130 can for example comprise one or more cameras. With image analysis software, the image or video feed of the one or more cameras can be analyzed in order to detect the crowdedness of the various exit points. Based on said analysis, the surveillance device 130 can then control the signal device 110 in guiding evacuees away from overcrowded exit points and towards less crowded exit points. Possible schemes for such a control can be based on absolute crowdedness, i.e. the number of evacuees trying to evacuate through an exit point, or on relative crowdedness, i.e. differences in the numbers of evacuees trying to evacuate through each exit point. In addition or as an alternative to cameras, the surveillance device 130 can also comprise other types of sensors, e.g. motion or proximity sensors.

When both an input device 120 and a surveillance device 130 are present, various examples for hierarchies among them can be envisioned. It is possible that the signal device 110 is only activated in response to a manual input via the input device 120 and the surveillance device 130 subsequently controls the signal device 110 to maximize the efficiency of the evacuation procedure. Conversely, it is possible that the signal device 110 is activated upon detection of overcrowding by the surveillance device 130 and personnel can subsequently correct the signal device 110 via the input device 120 if situations undetected by the surveillance device 130 arise, e.g. if an exit point was less crowded because it was being blocked by exterior circumstances or technical difficulties.

The evacuation support system 100 shown in FIG. 3 is shown comprising only one each of an input device 120 and a surveillance device 130. However, the evacuation support system 100 can also comprise multiple input devices 120 and/or surveillance device 130. In such a case, the amount of information with which the signal device 110 is controlled can be quite large, e.g. when multiple input devices 120 are activated by personnel. A computation device 140 can be used to analyze the information put into the signal device 110 and to dynamically control how the visual signal 111 and/or the audio signal 112 can be utilized to best guide evacuees away from overcrowded exit points and towards less crowded exit points, as the situation during the evacuation procedure changes.

FIG. 3 shows the computation device 140 as part of the signal device 110. It is also possible for computation device 140 to be a separate feature of evacuation support system 100. In that case, input device 110 and surveillance device 120 can communicate exclusively with computation device 140, which then controls the signal device 110.

The computation device 140 may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 aircraft
11 cabin
11a-11d exit point
100 evacuation support system
110 signal device
111 visual signal
112 audio signal
120 input device
130 surveillance device
140 computation device
E evacuee

The invention claimed is:

1. A method for supporting an evacuation procedure, the method comprising the steps of:
    providing an aircraft comprising a passenger cabin having a plurality of exit points distributed along a wall of the passenger cabin;
    providing an evacuation support system comprising:
        a controller,
        an input device in communication with the controller, the input device being manually operated,
        a surveillance device in communication with the controller, and
        a signaling device in communication with the controller;
    surveilling the plurality of exit points with the surveillance device;
    establishing a hierarchy between signals transmitted from the input device and the surveillance device;
    transmitting information related to the plurality of exit points from the input device and the surveillance device to the controller;
    dynamically controlling the signaling device with the controller based on the information transmitted to the controller from the input device and the surveillance device and the hierarchy; and
    guiding evacuees (E) away from an overcrowded exit point in the plurality of exit points and towards a less crowded exit point in the plurality of exit points via signals produced by the signaling device.

2. The method according to claim 1, wherein the evacuees (E) are guided by at least one visual signal of the signaling device.

3. The method according to claim 2, wherein the evacuees (E) are guided by a dynamic light source of the signaling device.

4. The method according to claim 1, wherein the evacuees (E) are guided by at least one audio signal of the signaling device.

* * * * *